T. A. BURKE.
KITCHEN UTENSIL.
APPLICATION FILED JULY 11, 1913.

1,116,988.

Patented Nov. 10, 1914.

WITNESSES
Samuel E. Wade,
Myron G. Clear.

INVENTOR
Thomas A. Burke
BY Munn & Co.
ATTORNEYS

UNITED STATES PATENT OFFICE.

THOMAS A. BURKE, OF GALESBURG, ILLINOIS.

KITCHEN UTENSIL.

1,116,988.  Specification of Letters Patent.  Patented Nov. 10, 1914.

Application filed July 11, 1913. Serial No. 778,524.

*To all whom it may concern:*

Be it known that I, THOMAS A. BURKE, a citizen of the United States, and a resident of Galesburg, in the county of Knox and State of Illinois, have invented certain new and useful Improvements in Kitchen Utensils, of which the following is a specification.

My present invention relates to kitchen utensils and more particularly to an implement adapted for use either as an egg separator, egg beater or cream whipper, my object being to provide a combined utensil of this character which is simple and inexpensive in its structure and highly effective in use.

Figure 1:
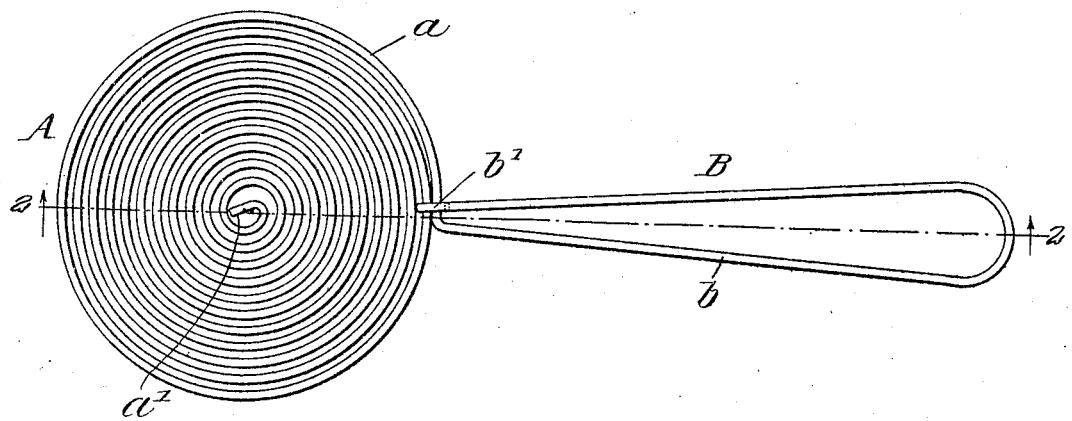
Figure 2:
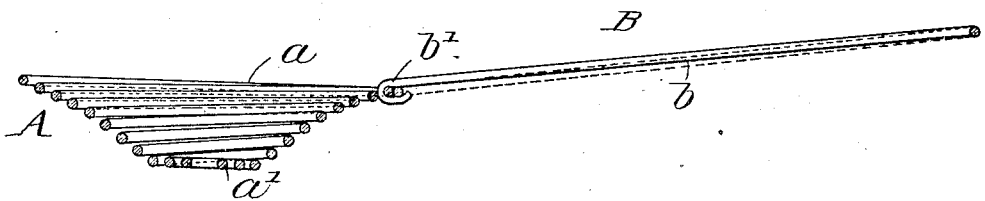

In the accompanying drawing, which illustrates my invention, Figure 1 is a plan view, and Fig. 2 is a longitudinal section taken substantially centrally therethrough on the line 2—2 of Fig. 1.

Referring now to these figures, my improved utensil consists of a body A formed by a helically coiled wire and a handle B formed of a continuation of the outer convolution *a* of the body, this continuation *b* being bent backwardly upon itself and having its extremity *b'* bent around the said outer convolution *a* and the next adjacent convolution of the body.

The body, which as before stated, is in the form of a helix, has several of its inner convolutions, particularly indicated at *a'* in Fig. 2, arranged in the same plane and providing a substantially flat inner support so that when an egg is broken into the helix, it will retain the yolk while the white of the egg runs out between the convolutions thereof.

The several convolutions of the body A will naturally have a certain amount of flexibility, depending upon the gage of wire used in its formation and from this fact, it may be readily seen that my improved utensil will be particularly effective in the beating of eggs and the whipping of cream.

I claim:

1. A utensil of the character described, constructed of a single piece of wire bent to form a helical body, the convolutions of which successively increase in diameter from a central point, and the outer convolution of which has a continuation extending angularly with respect to the body and in a direction substantially at right angles to the axis of the body and bent back upon itself, the extremity of which continuation is bent around certain of the convolutions of the body including the said outer convolution and the next adjacent inner convolution.

2. A utensil of the character described, comprising a body and a handle, the former of which is constructed of wire bent in helical shape, the convolutions of which successively increase in diameter from a central point, and certain of the inner convolutions of which are arranged to surround one another in the same plane to form a support, and the handle of which extends substantially at right angles to the axis of the body and is connected to the outer convolutions thereof, for the purpose described.

THOMAS A. BURKE.

Witnesses:
 ROY OVERAND,
 RALPH FREDERCKSON.